Figure 1:
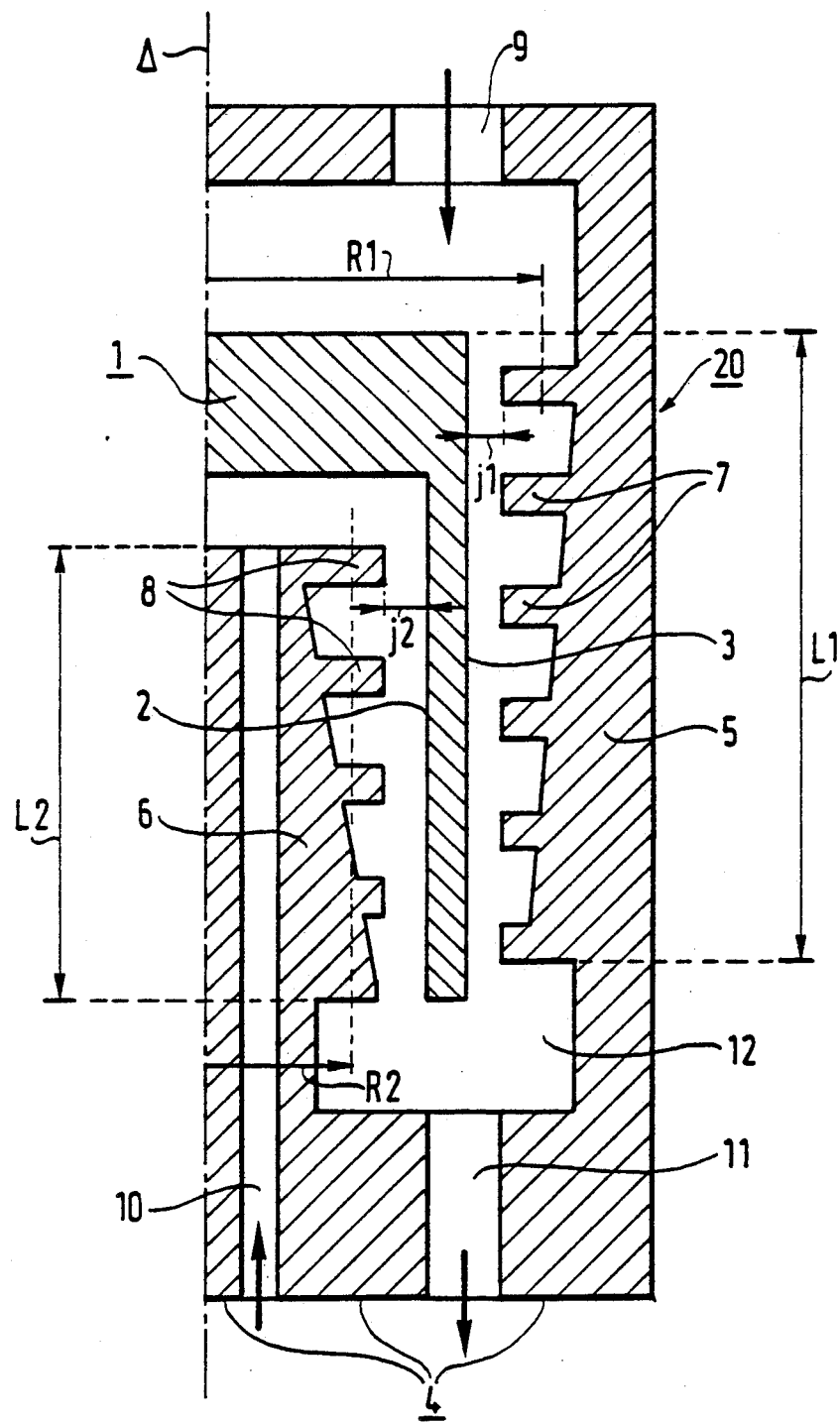

United States Patent [19]
Baret et al.

[11] Patent Number: 5,116,196
[45] Date of Patent: May 26, 1992

[54] MECHANICAL PUMP ASSEMBLY FOR PUMPING A SECONDARY VACUUM, AND A LEAK DETECTION INSTALLATION USING SUCH AN ASSEMBLY

[75] Inventors: Gilles Baret, Annecy; Denis Perrillat-Amede, Annecy le Vieux, both of France

[73] Assignee: Alcatel CIT, Paris, France

[21] Appl. No.: 550,403

[22] Filed: Jul. 10, 1990

[51] Int. Cl.$^5$ .............................................. F04D 19/04
[52] U.S. Cl. .................................... 415/89; 73/40.7
[58] Field of Search ....................... 415/89, 90; 73/40.7

[56] References Cited

U.S. PATENT DOCUMENTS

| | | | |
|---|---|---|---|
| 2,730,297 | 1/1956 | Van Dorsen et al. | 415/72 |
| 4,365,158 | 12/1982 | Tallon | 73/40.7 |
| 4,806,074 | 2/1989 | Bürger et al. | 415/90 |
| 4,893,985 | 1/1990 | Hölss | 415/90 |
| 4,904,155 | 2/1990 | Nagaoka et al. | 415/90 |
| 4,919,599 | 4/1990 | Reich et al. | 70/40.7 |
| 4,984,450 | 1/1991 | Bürger | 73/40.7 |

FOREIGN PATENT DOCUMENTS

| | | | |
|---|---|---|---|
| 169647 | 10/1982 | Japan | 73/40.7 |
| 48630 | 3/1984 | Japan | 73/40.7 |
| 8906320 | 7/1989 | U.S.S.R. | 415/90 |

*Primary Examiner*—Edward K. Look
*Assistant Examiner*—Michael S. Lee
*Attorney, Agent, or Firm*—Sughrue, Mion, Zinn, Macpeak & Seas

[57] ABSTRACT

A mechanical pump assembly (20) for pumping a secondary vacuum, the assembly comprising two pumping stages, the first stage having a suction inlet (9) and the second stage having a suction orifice (10), said inlet and said orifice both opening out to the outside, both stages having a common delivery outlet (4), the pump assembly being characterized in that both of said pumping stages are of the Holweck drum type, said first stage having a compression ratio of about 50 for a gas such as helium and of about 30,000 for air, the pumping speed of the first stage being about 4 l/s for air and about 2.5 l/s for said gas, and in that said second stage has a pumping speed of about 3.5 l/s for air and of about 2 l/s for said gas, the nominal speed of rotation of said mechanical pump assembly being about 27,000 rpm.

5 Claims, 2 Drawing Sheets

MECHANICAL PUMP ASSEMBLY FOR PUMPING A SECONDARY VACUUM, AND A LEAK DETECTION INSTALLATION USING SUCH AN ASSEMBLY

The present invention relates to a mechanical pump assembly for pumping a secondary vacuum and also to a leak detection installation using such an assembly.

European patent number 0 072 892 describes a mechanical pump assembly for pumping a secondary vacuum, the assembly comprising two pumping stages: the first stage having a suction inlet, the second stage having a suction orifice, with both said inlet and said orifice opening out to the outside, and with both stages having a common delivery outlet.

This mechanical pump assembly is used for counter flow leak detection by means of a tracer gas, with a spectrometer being connected to the suction end of the first stage while the vessel to be inspected is connected to the suction orifice of the second stage and a preliminary vacuum pump is connected to the common delivery outlet.

In that document, the two pumping stages are disposed axially one after the other and they are of the turbomolecular (or "molecular drag") type having motor and stator fins.

This system serves to perform counter flow leak detection with good sensitivity and short response time.

The object of the present invention is to propose such a mechanical pump assembly which is simpler to manufacture and cheaper and which is capable of operating at high delivery pressures of about one millibar with power efficiency that is considerably better than that of a pump of the type in the above-mentioned document at delivery pressures of more than $10^{-1}$ mbar.

The invention thus provides a mechanical pump assembly for pumping a secondary vacuum, the assembly comprising two pumping stages, the first stage having a suction inlet and the second stage having a suction orifice, said inlet and said orifice both opening out to the outside, both stages having a common delivery outlet, the pump assembly being characterized in that both of said pumping stages are of the Holweck drum type, said first stage having a compression ratio of about 50 for a gas such as helium and of about 30,000 for air, the pumping speed of the first stage being about 4 liters per second (l/s) for air and about 2.5 l/s for said gas, and in that said second stage has a pumping speed of about 3.5 l/s for air and of about 2 l/s for said gas, the nominal speed of rotation of said mechanical pump assembly being about 27,000 revolutions per minute (rpm).

In a preferred embodiment, the mechanical pump assembly comprises a single bell-shaped rotor having walls which are smooth on the inside and on the outside, and a stator having an outer first portion surrounding said rotor and an inner second portion penetrating inside said rotor, the rotor-facing wall of said first portion of the stator bears threads of depth which decreases from the suction inlet formed through the stator to said common delivery outlet, the space between the rotor and said first portion of the stator constituting said first pumping stage, and the rotor-facing wall of said second portion of the stator bears threads of depth which decreases from said suction orifice formed through the stator to said common delivery outlet, the space between the rotor and said second portion of the stator forming said second pumping stage.

The invention also provides an installation for detecting leaks from a vessel under test by means of a tracer gas, the installation comprising a mechanical secondary pump assembly having two pumping stages, the first stage having a suction inlet, the second stage having a suction orifice, said inlet and said orifice both opening out to the outside of the pump, the two stages having a common delivery outlet, said suction inlet being connected to a gas analyzer, said common delivery outlet being connected to a primary pump via a first duct provided with a first valve, and said suction orifice being fitted with a second duct provided with a second valve, said second duct being suitable for connection to said vessel, the installation being characterized in that both of said pumping stages of said mechanical pump assembly are of the Holweck drum type, said first stage connected to said gas analyzer having a compression ratio of about 50 for said tracer gas and of about 30,000 for air, the pumping speed of said first stage being about 4 l/s for air and about 2.5 l/s for said tracer gas, and in that said second stage has a pumping speed of about 3.5 l/s for air and about 2 l/s for said gas, the nominal speed of rotation of said mechanical pump assembly being about 27,000 rpm.

In a preferred embodiment, a third duct provided with a third valve connects said second duct upstream from second valve to said first duct downstream from said first valve.

Figure 2:
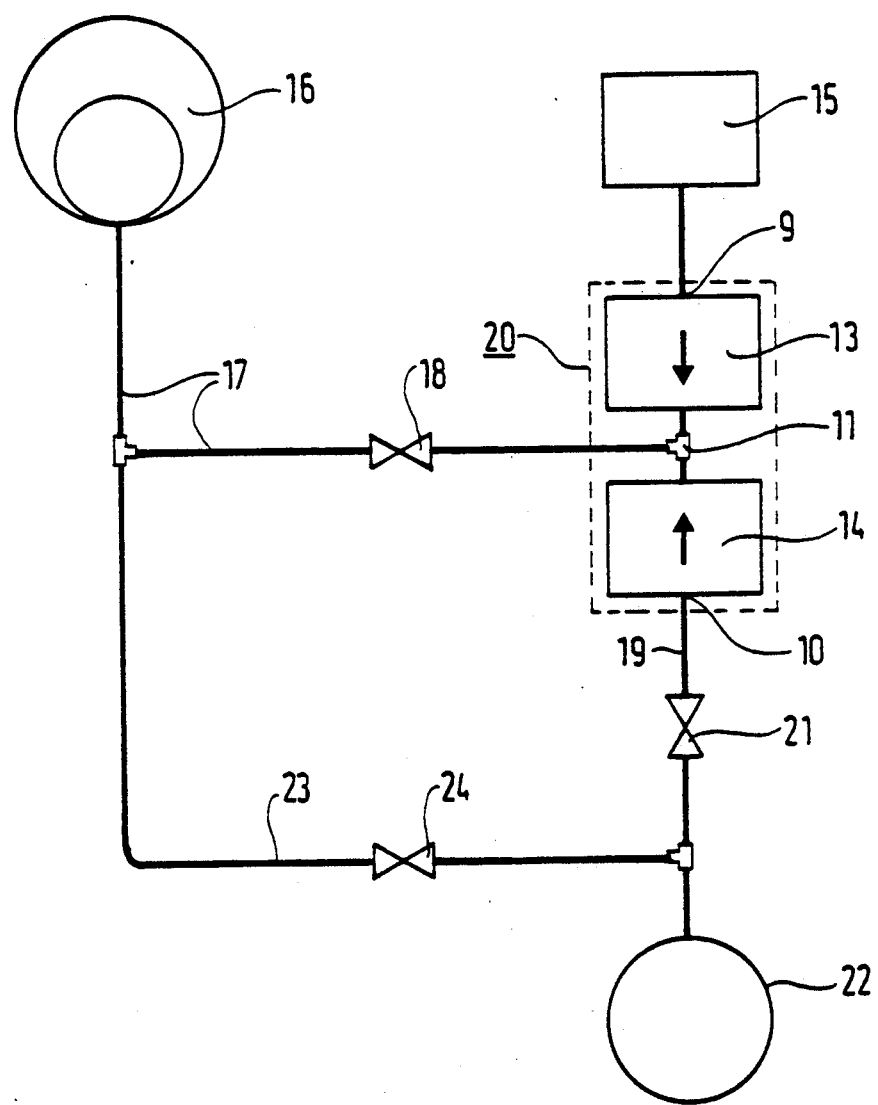

The invention is now described with reference to the accompanying drawings, in which:

FIG. 1 is a diagrammatic axial half section through a mechanical pump assembly of the invention; and FIG. 2 is a diagram of a leak detection installation including a mechanical pump assembly as shown in FIG. 1.

The mechanical pump assembly 20 shown in FIG. 1 is a pump assembly comprising two concentric Holweck type drum stages. It comprises a two-portion stator 4 and a single bell-shaped rotor 1 whose inside and outside walls 2 and 3 are smooth.

The stator 4 comprises an outer first portion 5 surrounding the rotor 1 and an inner second portion 6 which penetrates inside the rotor 1.

The rotor-facing wall of each portion of the stator has threads: threads 7 on the first portion 5 of the stator, and threads 8 on the second portion 6 of the stator. The space situated between the rotor 1 and the first portion 5 of the stator 4 constitutes the first stage of the mechanical pump assembly and it has a suction inlet 9 provided through the stator 4. The space situated between the rotor 1 and the second portion 6 of the stator 4 constitutes the second stage of the mechanical pump assembly and it possesses a suction orifice 10 provided through the stator 4. As can be seen, the suction inlet 9 and the suction orifice 10 are both open to the outside of the mechanical pump assembly.

The mechanical pump assembly also includes a common delivery outlet 11 which naturally opens out to the outside and which also opens out into an annular chamber 12 which is common to the delivery ends of both stages.

As can be seen in the figure, the depth of the threads in each stage (7 in the first stage and 8 in the second stage) decreases from the suction end 9, 10 to the delivery end 11.

The compression ratio of the first stage for a low molecular weight gas such as helium is about 50, while it is about 30,000 for air. The pumping speed of the first stage is about 4 l/s for air and about 2.5 l/s for helium or a gas having a similar molecular mass. For the second stage, the pumping speed is about 3.5 l/s for air and about 2 l/s for helium.

Such a Holweck type pump assembly makes it possible to provide pumping stages in which the compression ratio and pumping speed parameters are sufficiently independent to obtain an optimum result.

Pumping speed depends almost solely on the depth of the threads at the beginning of each stage, at its suction end.

The compression ratio depends almost solely on the clearance between the rotor and the stator and on the length of the stage.

The speed of rotation is also a factor which determines the pumping speed and the compression ratio, but it is selected to be low enough for the pump assembly to have excellent mechanical strength while rotating.

By way of example, in order to obtain these operating characteristics, the following structural data may be used:

- each stage possesses five threads which are machined from the suction end over a length of 26 mm with each thread then being subdivided into two, giving ten threads upto the delivery end;
- the angle of inclination of the threads relative to the axis of rotation $\Delta$ of the mechanical pump assembly is 65°;
- the depth of the threads at the suction end of the first stage is 4 mm and it is 1 mm at the delivery end;
- the depth of the threads at the suction end of the second stage is 4 mm and it is 1 mm at the delivery end;
- the length L1 of the first stage is 90 mm and the depth L2 of the second stage is 75 mm;
- the clearance j1 of the first stage is 0.2 mm and the clearance j2 of the second stage is 0.15 mm;
- the mean radius R1 of the threads of the first stage is 36 mm;
- the mean radius R2 of the threads of the second stage is 30 mm; and
- the nominal speed of rotation of the rotor 1 is 27,000 rpm.

As can be seen in the figure, the mechanical structure of the assembly is such that the common delivery outlet 11 and the suction orifice 10 of the second stage are both situated on the bottom of the mechanical pump assembly, thereby simplifying various connections and also reducing the cost of machining the assembly itself.

FIG. 2 is a diagram of an installation for detecting leaks by means of a tracer gas such as helium, the installation including a mechanical secondary pump assembly 20 as described above and shown in FIG. 1.

In this figure, reference 13 designates the first pumping stage and reference 14 designates the second pumping stage of the mechanical pump assembly 20.

A gas analyzer 15 is connected to the suction inlet 9 of the first stage 13, and is constituted, for example, by a mass spectrometer adjusted for helium. A primary pump 16 is connected to the common delivery outlet 11 via a first duct 17 provided with a first valve 18. The suction orifice 10 of the second stage 14 is fitted with a second duct 19 provided with a second valve 21. This second duct 19 has a connection flange (not shown) at its end enabling it to be connected to a vessel 22 under test.

Finally, a third duct 23 provided with a third valve 24 connects the second duct 19 upstream from the second valve 21 to the first duct 17 downstream from the first valve 18.

In operation, the installation has a counter flow through the first stage 13 which has a relatively low compression ratio for helium of about 50 as mentioned above, together with a relatively high compression ratio of about 30,000 for air.

As already mentioned above, the mechanical secondary pump assembly 20 has a speed of rotation of 27,000 rpm, which is low relative to the speed of rotation generally used in turbo-molecular vane pumps which frequently rotate at more than 30,000 rpm.

This reduces the gyroscopic effect and makes it possible to displace the apparatus while it is in operation.

When leak testing is performed on a part 22 whose volume may be large, the third valve 24 is closed and the first and second valves 18 and 21 are opened. In this operating mode, the apparatus benefits from avoiding contamination of the part under test 22 with any hydrocarbon vapor that may come from the primary pump 16 since such vapor is stopped by the high compression ratio of the second pump stage 14 for such vapor, the response time is short because of the high pumping speed of the stage 14 of the secondary pump 20, and good sensitivity is retained.

For inspecting small-volume parts 22 at a high rate, the second valve 21 is closed and the first and third valves 18 and 24 are opened.

In both cases, the sensitivity of the installation depends only on the pumping speed of the primary pump 16 and on the helium compression ratio of the first pumping stage 13.

We claim:

1. In a mechanical pump assembly (20) for pumping a secondary vacuum, comprising two pumping stages, the first stage having a suction inlet (9) and the second stage having a suction orifice (10), said inlet said orifice both opening out to the outside, both stages having a common delivery outlet (4), the improvement wherein said pumping stages are solely of the Holweck drum type, said first stage having a compression ratio of about 50 for a gas such as helium and of about 30,000 for air, the pumping speed of the first stage being about 4 l/s for air and about 2.5 l/s for said gas, and in that said second stage has a pumping speed of about 3.5 l/s for air and of about 2 l/s for said gas, the nominal speed of rotation of said mechanical pump assembly being about 27,000 rpm.

2. A mechanical pump assembly (20) for pumping a secondary vacuum, comprising two pumping stages, the first stage having a suction inlet (9) and the second stage having a suction orifice (10), said inlet and said orifice both opening out to the outside, both stages having a common delivery outlet (4), both of said pumping stages are of the Holweck drum type, said first stage having a compression ration of about 50 for a gas such as helium and of about 30,000 for air, the pumping speed of the first stage being about 4 l/s for air and about 2.5 l/s for said gas, and said second stage has a pumping speed of about 3.5 l/s for air and of about 2 l/s for said gas, the nominal speed of rotation of said mechanical pump assembly being about 27,000 rpm;

said pump assembly further comprising a single bell-shaped rotor (1) having walls which are smooth on the inside and on the outside, and a stator (4) having an outer first portion (5) surrounding said rotor and an inner second portion (6) penetrating inside said rotor (1), the rotor-facing wall of said first portion of the stator bearing threads (7) of a depth which decreases from the suction inlet (9) formed through the stator to said common delivery outlet (4), the space between the rotor and the first portion of the stator constituting said first pumping stage, and the rotor-facing wall of said second portion of the stator bearing threads (8) of a depth which decreases from said suction orifice (10) formed through the stator to said common delivery outlet (11), and the space between the rotor and the second portion of the stator forming said second pumping stage.

3. In an installation for detecting leaks from a vessel under test by means of a tracer gas comprising a mechanical secondary pump assembly (20) having two pumping stages, the first stage (13) having a suction inlet (9), the second stage (14) having a suction orifice (10), said inlet and said orifice both opening out to the outside of the pump, the two stages having a common delivery outlet (11), said suction inlet (9) being connected to a gas analyzer (15), said common delivery outlet (11) being connected to a primary pump (16) via a first duct (17) provided with a first valve (18), and said suction orifice (10) being fitted with a second duct (19) provided with a second valve (21), said second duct being suitable for connection to said vessel, the improvement wherein said pumping stages of said mechanical pump assembly are solely of the Holweck drum type, said first stage (13) connected to said gas analyzer (15) having a compression ratio of about 50 for said tracer gas and of about 30,000 for air, the pumping speed of said first stage being about 1/s for air and about 2.5 1/s for said tracer gas, and said second stage (14) having a pumping speed of about 3.5 1/s for air and about 2 1/s for said gas, and the nominal speed of rotation of said mechanical pump assembly being about 27,000 rpm.

4. An installation according to claim 3, characterized in that said mechanical pump assembly (20) comprises a single bell-shaped rotor (1) having walls which are smooth on the inside and on the outside, and a stator (4) having an outer first portion (5) surrounding said rotor and an inner second portion (6) penetrating inside said rotor (1), in that the rotor-facing wall of said first portion of the stator bears threads (7) of depth which decreases from the suction inlet (9) formed through the stator to said common delivery outlet (4), the space between the rotor and said first portion of the stator constituting said first pumping stage, and in that the rotor-facing wall of said second portion of the stator bears threads (8) of depth which decreases from said suction orifice (10) formed through the stator to said common delivery outlet (11), the space between the rotor and said second portion of the stator forming said second pumping stage.

5. An installation according to claim 3, characterized in that a third duct (23) provided with a third valve (24) connects said second duct (19) upstream from second valve (21) to said first duct (17) downstream from said first valve (18).

* * * * *